(12) United States Patent
Bonnet

(10) Patent No.: US 6,554,123 B2
(45) Date of Patent: *Apr. 29, 2003

(54) HIGH SPEED PARCEL SORTER

(75) Inventor: Henri Bonnet, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/050,405

(22) Filed: Jan. 15, 2002

(65) Prior Publication Data

US 2002/0056607 A1 May 16, 2002

Related U.S. Application Data

(63) Continuation of application No. 09/469,097, filed on Dec. 21, 1999, now Pat. No. 6,390,275.

(51) Int. Cl.⁷ .......................... B65G 47/38; B65G 47/96
(52) U.S. Cl. ........................ 198/370.04; 198/370.06; 209/592; 209/584; 209/559
(58) Field of Search ................ 209/586, 592, 209/593, 596, 655, 698, 659; 198/371.1, 370.04, 370.06

(56) References Cited

U.S. PATENT DOCUMENTS

| | | | | |
|---|---|---|---|---|
| 3,275,135 A | * | 9/1966 | Niese | 198/369.3 |
| 3,348,678 A | * | 10/1967 | Flowers | 198/369.3 |
| 3,643,798 A | * | 2/1972 | Krupotich | 209/564 |
| 3,759,381 A | * | 9/1973 | Mercadie et al. | 209/559 |
| 3,895,716 A | * | 7/1975 | Ugo | 198/349 |
| 4,016,072 A | * | 4/1977 | Cavenar | 198/349.6 |
| 4,690,283 A | * | 9/1987 | Carrell | 193/23 |
| 4,763,771 A | | 8/1988 | Geerts | |
| 4,884,676 A | * | 12/1989 | Suizu | 198/370.06 |
| 4,938,335 A | * | 7/1990 | Canziani | 198/370.06 |
| 5,024,316 A | * | 6/1991 | Scata et al. | 198/369.3 |
| 5,090,552 A | * | 2/1992 | Fukuyama et al. | 198/370.04 |
| 5,161,930 A | * | 11/1992 | Canziani | 198/370.06 |
| 5,307,921 A | * | 5/1994 | Richardson | 198/370.04 |
| 5,433,311 A | | 7/1995 | Bonnet | |
| 5,570,773 A | | 11/1996 | Bonnet | |
| 5,579,922 A | * | 12/1996 | Arlt et al. | 209/592 |
| 5,588,520 A | * | 12/1996 | Affaticati et al. | 198/370.06 |
| 5,690,209 A | | 11/1997 | Kofoed | |
| 5,894,919 A | * | 4/1999 | Tacchi et al. | 198/370.01 |
| 5,990,437 A | * | 11/1999 | Coutant et al. | 198/349.95 |
| 6,095,314 A | * | 8/2000 | Fortenbery | 198/360 |
| 6,323,452 B1 | * | 11/2001 | Bonnet | 198/370.04 |
| 6,478,138 B1 | * | 11/2002 | Edwards et al. | 198/370.06 |

FOREIGN PATENT DOCUMENTS

| | | |
|---|---|---|
| DE | 93 02 336 U | 6/1993 |
| DE | 43 38 801 A | 5/1995 |
| FR | 2475015 A | 8/1981 |
| FR | 2576528 A | 8/1986 |
| FR | 2771313 A | 5/1999 |
| JP | 401181613 | 7/1989 |
| JP | 402138010 | 5/1990 |
| JP | 404277116 | 10/1992 |
| WO | WO 00/71446 A | 11/2000 |

* cited by examiner

*Primary Examiner*—Donald P. Walsh
*Assistant Examiner*—Daniel K Schlak
(74) *Attorney, Agent, or Firm*—Alston & Bird LLP

(57) ABSTRACT

A conveyor system particularly configured for discrete parcels, which combines tilting tray concepts with "crossbelt" or powered conveyor concepts, which allows for the acceleration of parcels above one gravity force "G". In one configuration, two levels can be used, the upper for larger packages, and the lower for smaller packages.

27 Claims, 7 Drawing Sheets

HIGH SPEED PARCEL SORTER

CROSS-REFERENCE TO RELATED APPLICATION

The present application is a continuation application of application Ser. No. 09/469,097, filed Dec. 21, 1999 and patented on May 21, 2002 as U.S. Pat. No. 6,390,275 B1. The present application claims the benefit and priority of this application to the fullest extent provided by law, and incorporates by reference the contents of application Ser. No. 09/469,097.

TECHNICAL FIELD

The present invention generally relates to conveyor systems, and particularly relates to conveyor systems which allow for selective discharge therefrom.

BACKGROUND OF THE INVENTION

Due to the high cost of automated sorting equipment, such equipment must be very productive and efficient for its use to be profitable to its owner.

The sortation of small parcels demands a particularly high productivity level in order to be lucrative to the shipper. One reason is that small packages by virtue of their low weight and low volume command a relatively low shipping fee, yet they must be individually sorted like any other parcel in order to get to their destination. Therefore the transportation company that actually does the sorting needs to make sure that the automated sorting machines it uses are considerably more efficient than those handling large parcels, which command higher shipping fees.

However, most known systems currently in existence either use cross belt sorters or gravity in order to discharge small packages. Neither of these methods allow for a very fast discharge speed, hence the resulting low relative productivity.

Kofoed, U.S. Pat. No. 5,690,209, issued Nov. 25, 1997 discloses the use of a sorting conveyor having powered transverse conveyors. However, the transverse conveyors do not tilt. In the case of such "cross belt" sorters, speeding up of the cross belt runs against the forces of inertia which either causes the packages to slip or tumble on the belt itself. So in all these cases the acceleration cannot exceed 1G, if one is to maintain its parcel under control and avoid missorting. Therefore the travel speed of the whole system is forced to be relatively low.

U.S. Pat. No. 5,433,311, entitled "Dual Level Tilting Tray Package Sorting Apparatus" discloses the use of multiple "tilting trays", which when tilted, allow packages to slide therefrom into appropriate chutes. In the case of such a tilt tray sorter, parcels are discharged due to the forces of gravity which are resisted by the forces of inertia as well as friction. The result is a-relatively low discharge rate, a relatively low travel speed and a relatively low productivity.

Therefore there is a need in the art to provide a method and apparatus for sorting both large and small packages with improved efficiently and with minimum machine costs.

SUMMARY OF THE INVENTION

The present invention overcomes deficiencies in the prior art by providing a conveyor system which combines the advantages of powered conveyor sorting mechanisms with the advantages of "tilting tray" conveying systems to provide an apparatus which can sort both large and small packages with improved efficiency.

Generally described, the present invention is directed towards a conveying apparatus for conveying articles, the apparatus comprising a stationary frame defining a path and at least one conveying module for movement along the path, each module itself comprising a conveying module frame member configured for translational movement along the path, a pivoting conveying subassembly pivotably attached relative to the conveying module frame member, the pivoting conveying subassembly including a selectively powered conveyor for selectively discharging an article thereon, and a tilting mechanism for tilting the pivoting conveying subassembly and the powered conveyor relative to the conveying module frame member, such that the pivoting conveying subassembly, including the powered conveyor, can be in a tilted position at the same time the powered conveyor is powered, thus causing the article atop the powered conveyor to be discharged both by gravity and conveyor force.

Therefore it is an object of the present invention to provide an improved conveyor apparatus and method of using same.

It is a further object of the present invention to provide an improved conveyor apparatus which provides improved discharge features.

It is a further object of the present invention to provide an improved conveyor apparatus which is effective in its discharge.

It is a further object of the present invention to provide an improved conveyor apparatus which is accurate in its discharge.

It is a further object of the present invention to provide an improved conveyor apparatus which is simple in operation.

It is a further object of the present invention to provide an improved conveyor apparatus which is simple in construction.

It is a further object of the present invention to provide an improved conveyor apparatus which is efficient in operation.

It is a further object of the present invention to provide an improved conveyor apparatus which can accommodate a variety of parcels.

It is a further object of the present invention to provide an improved conveyor apparatus which can accommodate a variety of parcel weights and sizes.

It is a further object of the present invention to provide an improved conveyor apparatus which can discharge to different levels.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the drawings, in which like numerals indicate like elements throughout the several views.

General Discussion

Figure 1:
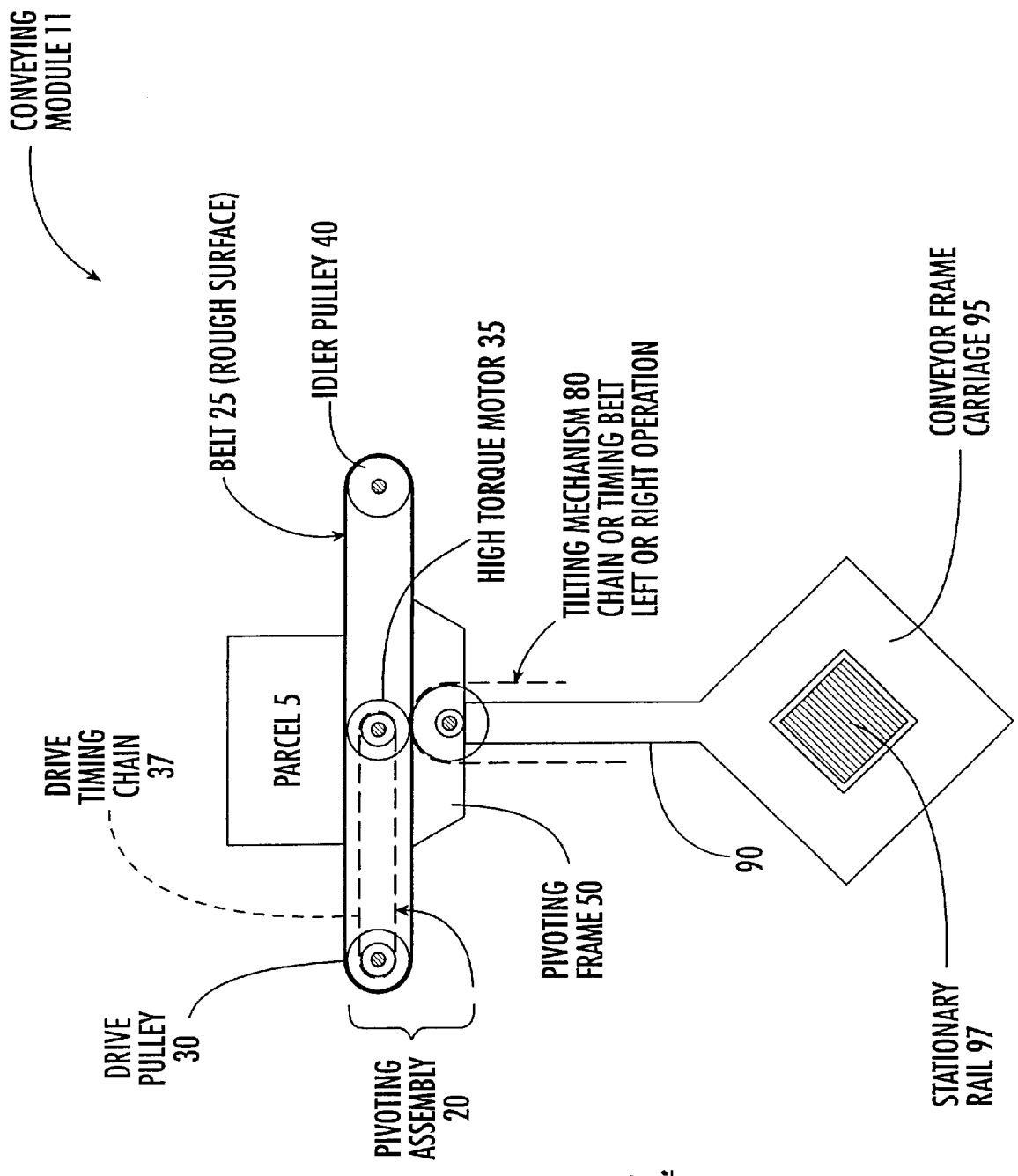
FIG. 1 is an illustrative front elevational view of a conveying module of a conveyor apparatus according to the present invention, used to transport an article such as a parcel (a.k.a. a "package") 5. The conveying module 11 is configured to move along with other similar modules along a path or track provided by a stationary endless rail 97.
Figure 2:
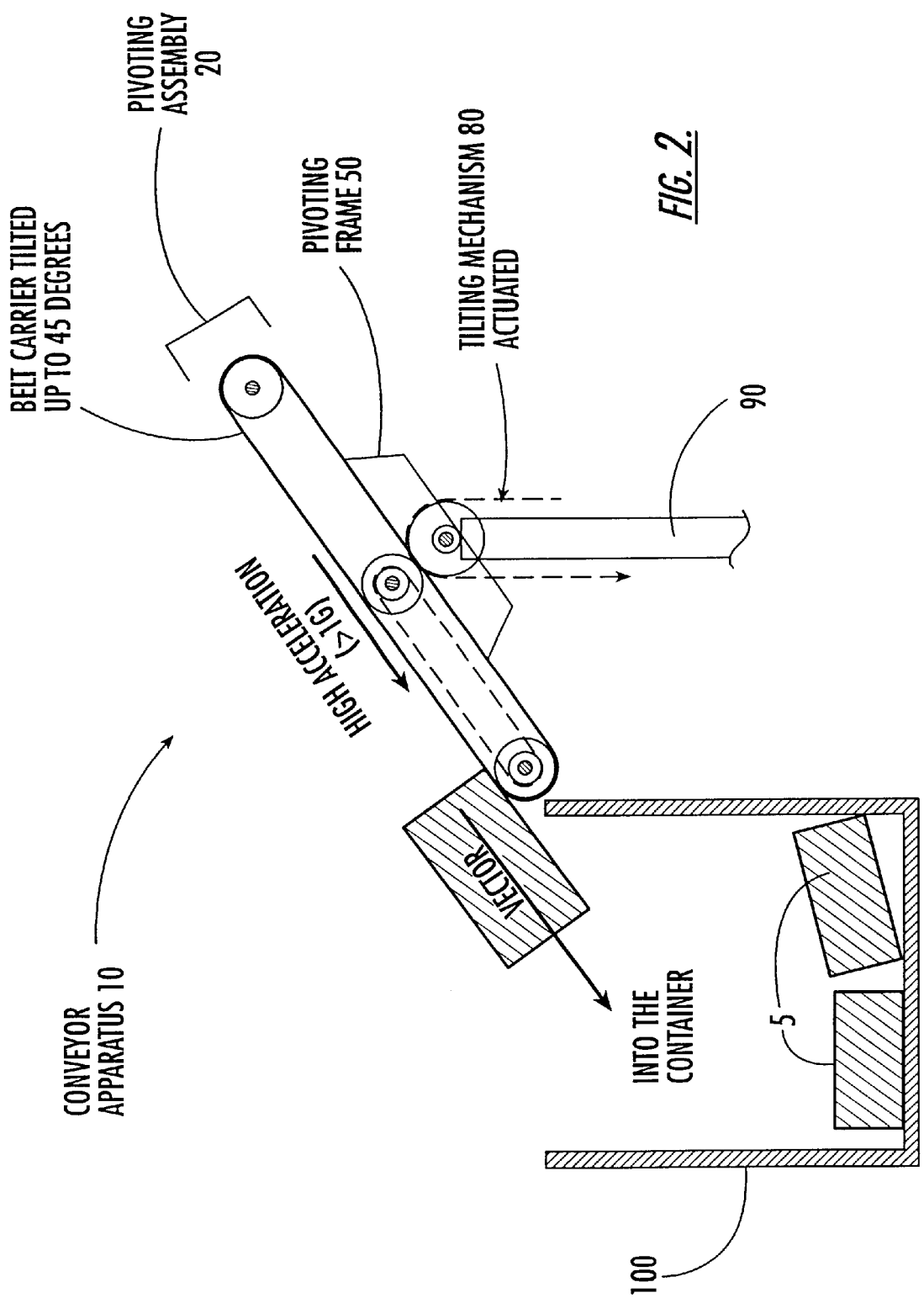
FIG. 2 is an front elevational illustrative view showing the configuration 10 of FIG. 1 with the pivoting frame 50 of the pivoting assembly 20 tilted from the neutral orientation of FIG. 1 to a tilted orientation. The parcel 5 shown atop the pivoting assembly 20 is shown being discharged into a parcel-accepting container 100.

Reference is first made to FIGS. 1 and 2. The machine consists of a tilting mechanism that is also equipped with a powered conveyor belt, instead of a gravity tray (a tray which allows the parcels to slide off solely under the influence of gravity).

The resulting apparatus is a sorting machine capable of very high sorting speed and therefore high productivity while providing package acceleration capable of exceeding 1G, while keeping the parcel in control with a minimum of slipping or tumbling.

It should be understood that the term "tilting" and "pivoting" are used interchangeably in this description.

More Detailed Discussion

For background purposes, reference is first made to U.S. Pat. No. 5,433,311, entitled "Dual Level Tilting Tray Package Sorting Apparatus" hereby incorporated by reference. This '311 Patent discloses the use of multiple "tilting trays", which when tilted, allow packages to slide therefrom into appropriate chutes.

The present invention could be thought of modifying the apparatus shown in the '311 Patent to include tilting powered transverse conveyors, instead of the tilting smooth trays used in the '311 Patent.

Reference is now particularly made to FIGS. 1 and 2. The machine consists of a tilt mechanism that is also equipped with a powered conveyor belt instead of a gravity tray. The resulting apparatus is a sorting machine capable of very high sorting speed and therefore high productivity while providing package acceleration capable of exceeding 1G, while keeping the parcel in control with a minimum of slipping or tumbling.

The Overall Environment

FIG. 1 is an front elevational illustrative view of a conveying module of a conveyor apparatus according to the present invention, used to transport a parcel (a.k.a. a "package") 5. The conveying module 11 is configured to move along with other similar modules along a path or track provided by a stationary endless rail 97.

FIG. 2 is an front elevational illustrative view showing the configuration 10 of FIG. 1 with the pivoting frame 50 of the pivoting assembly 20 tilted from the neutral orientation of FIG. 1 to a tilted orientation. The; parcel 5 shown atop the pivoting assembly 20 is shown being discharged into a parcel-accepting container 100.

Figure 3:
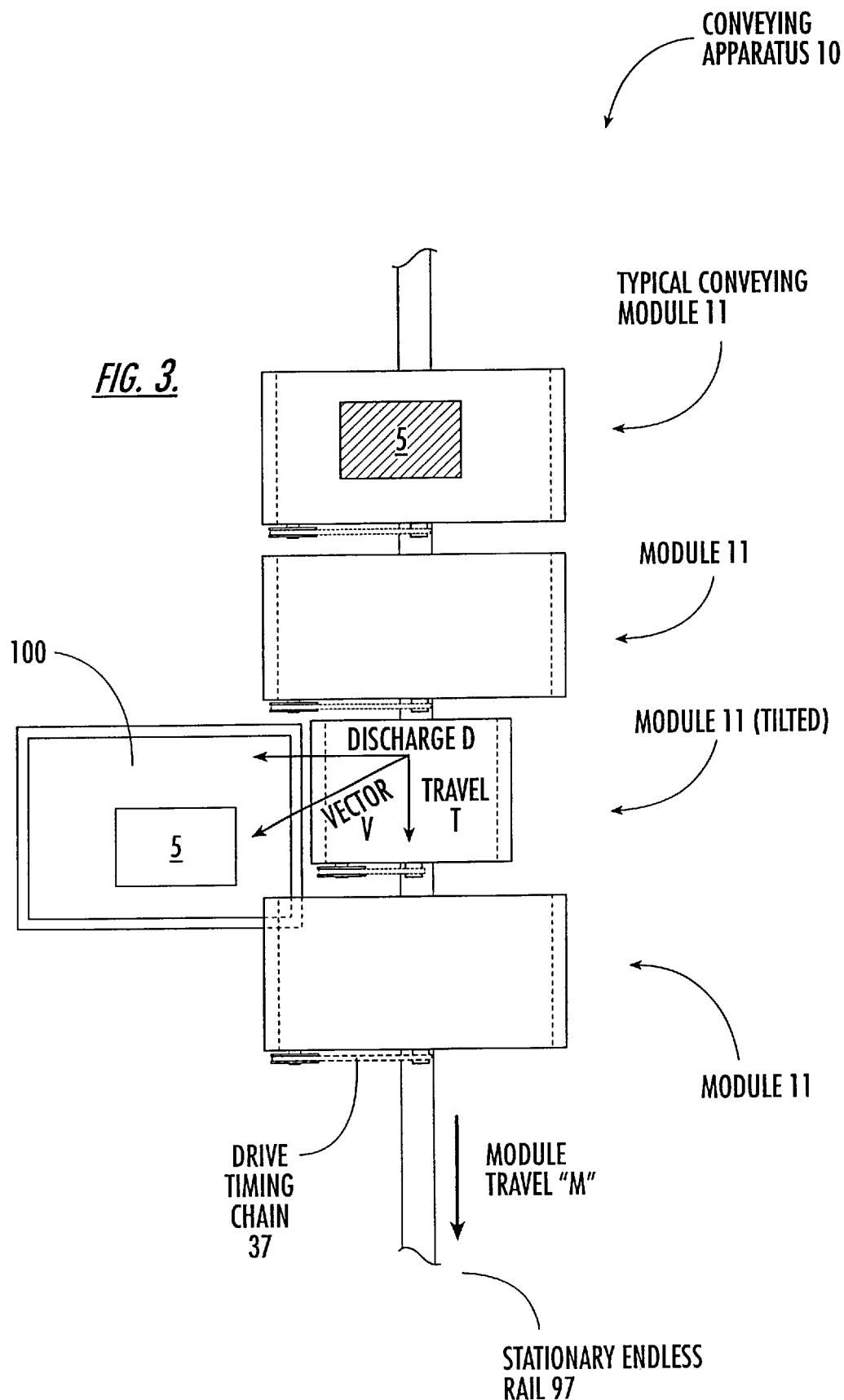
FIG. 3 shows a top plan view of a portion of the conveying apparatus 10 according to the present invention, illustrating a total of four (4) conveying modules 11, one of which is tilted towards a destination chute 100, having just discharged a parcel 5 therein. Vectors D (discharge) T (travel) and V (resulting vector) are likewise shown. The stationary endless rail 97 supports the modules 11 as they travel in a direction towards th- bottom of the page.

FIG. 3 shows a top plan view of a portion of the conveying apparatus 10 according to the present invention, illustrating a total of four (4) conveying modules 11, one of which is tilted towards a destination chute 100, having just discharged a parcel 5 therein. Vectors D (discharge) T (travel) and V (resulting vector) are likewise shown. The stationary endless rail 97 supports the modules 11 as they travel in a direction towards the bottom of the page.

Figure 4:
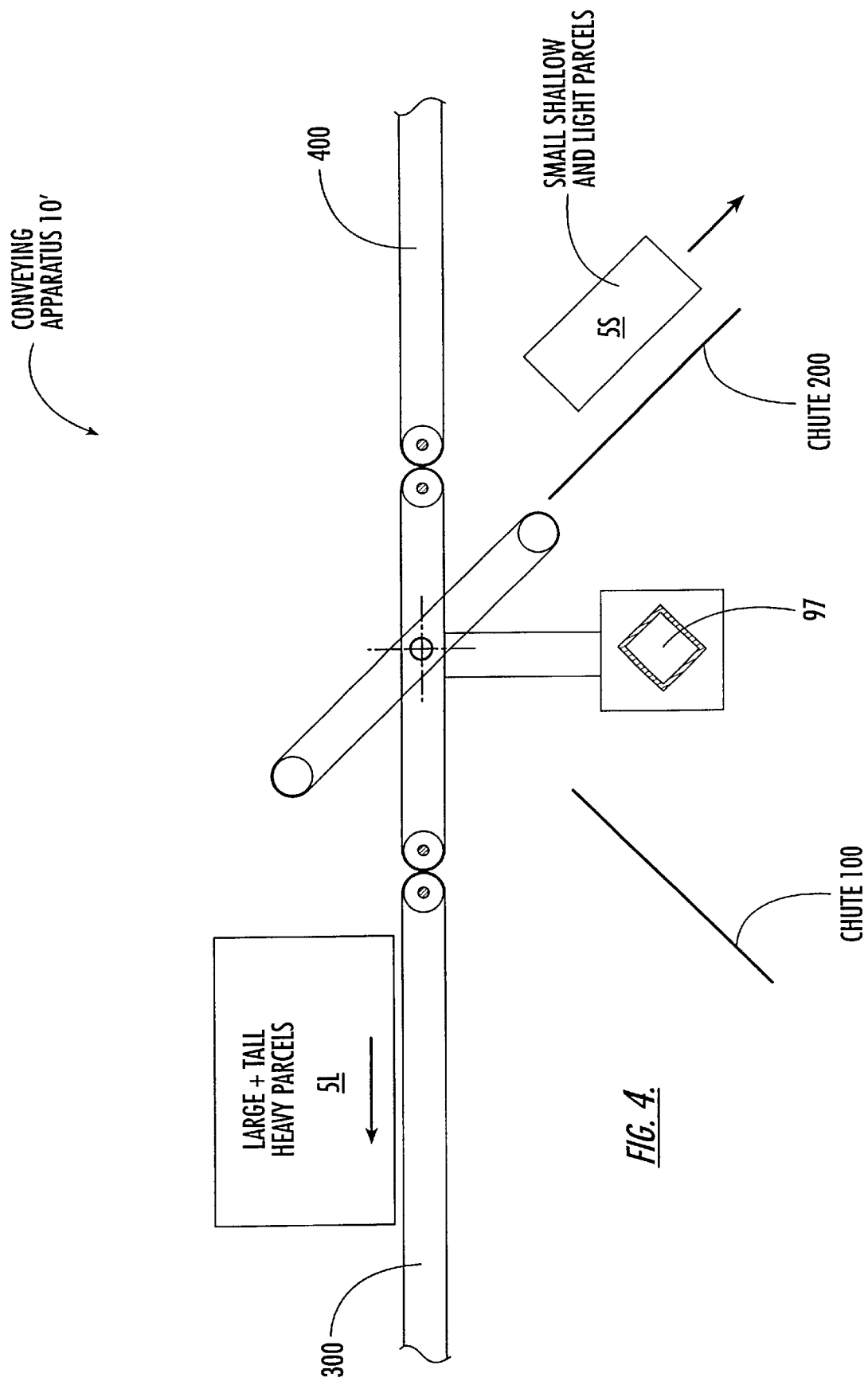
FIG. 4 shows optional additions to the conveying apparatus, being upper withdrawal belt conveyors 300, 400, which provides an "upper level" of discharge beyond the lower level of discharge provided into chutes 100, 200. Such a configuration can be used with a method according to the present invention for sorting large parcels 5L separately from small parcels 5S.

FIG. 4 shows optional additions to the conveying apparatus, being upper withdrawal belt conveyors 300, 400, which provides an "upper level" of discharge beyond the lower level of discharge provided into chutes 100, 200. Such a configuration can be used with a method according to the present invention for sorting large parcels separately from small parcels.

Figure 5:
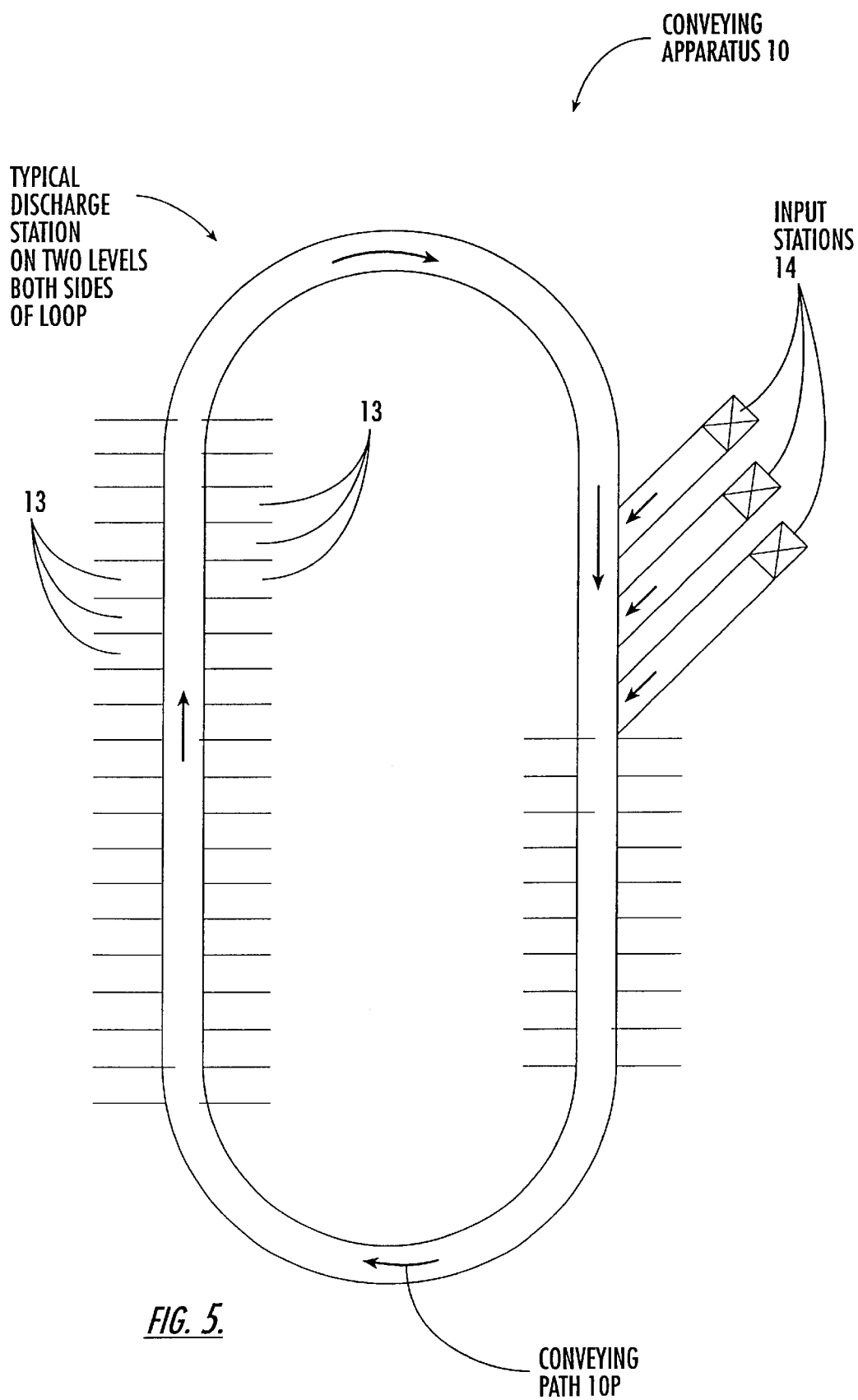
FIG. 5 shows an overall conveyor configuration 10, which includes an endless path conveying path 10P having a plurality of discharge stations 13 on both sides of the path 10P. Multiple input stations 14 are also shown, which can include conventional measuring devices to measure the weight and dimensional properties of the parcels as known in the art.

FIG. 5 shows an overall conveyor configuration 10, which includes an endless path conveying path 10P having a plurality of discharge stations 13 on both sides of the path 10P. Multiple input stations 14 are also shown, which can include conventional measuring devices to measure the weight and dimensional properties of the parcels as known in the art.

Figure 6:
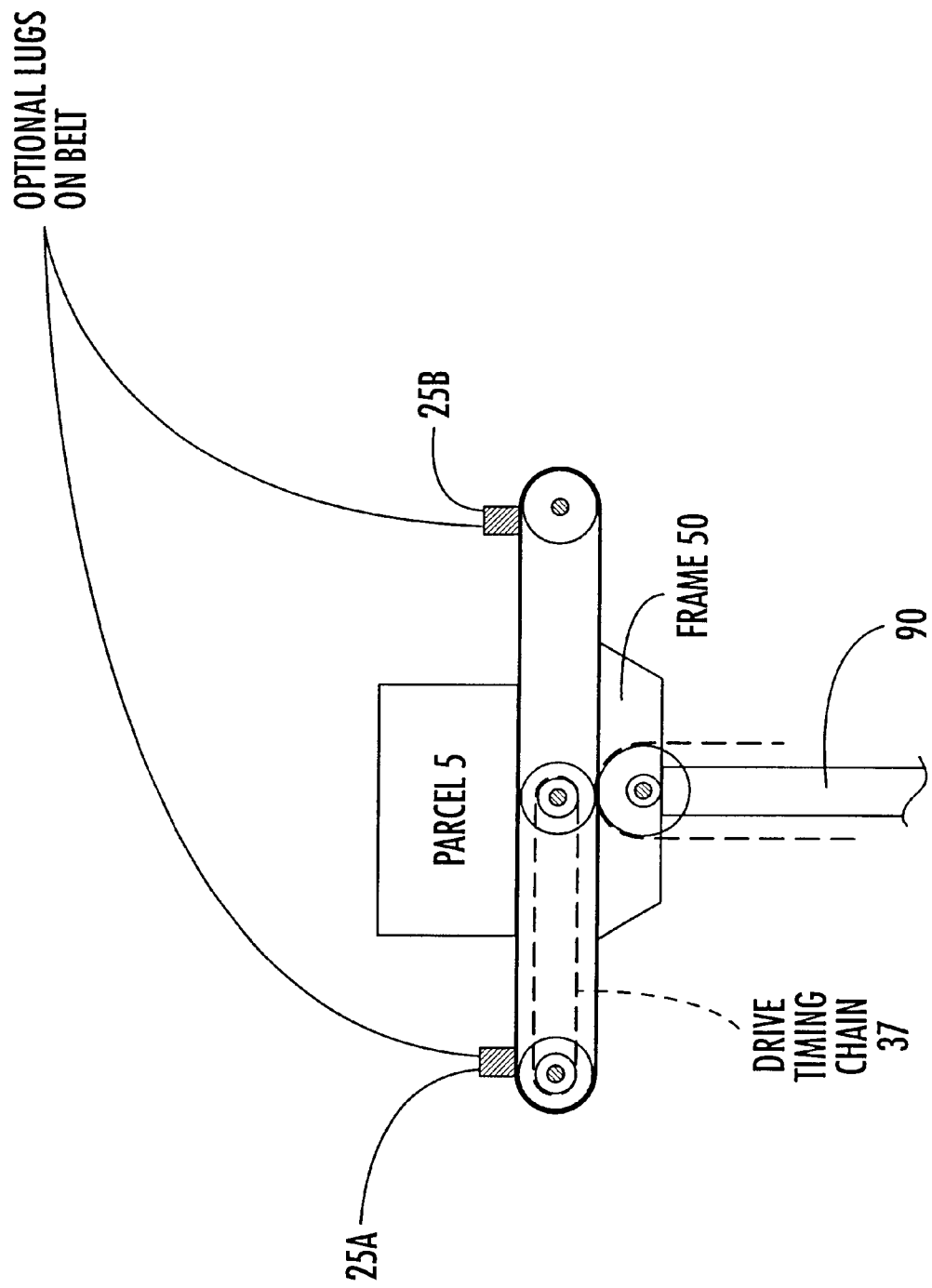
FIG. 6 shows an alternative belt configuration which includes optional pushing lugs 25A, 25B which are attached atop the powered conveyor belt 20.

FIG. 6 shows an alternative belt configuration which includes optional lugs 25A, 25B which are attached atop the powered conveyor belt 20.

The Individual Elements

Referring now generally to FIGS. 1—3, the discharge apparatus 10 includes a plurality of conveying modules 11 which are configured to move along a path or track provided by a stationary endless rail 97 being part of a stationary frame member structure.

Each conveying module 11 includes the following:
a pivoting conveying subassembly 20,
a tilting mechanism 80,
a conveying module frame member 90 including a conveyor frame carriage 95.

Each pivoting conveying subassembly 20 itself includes:
a conveyor belt 25,
a drive pulley 30,
a high torque motor 35,
a drive timing chain 37,
an idler pulley 40,
a pivoting assembly frame 50, The conveying module 11 discharges parcels (a.k.a. packages) or other items into containers such as 100 shown in FIG. 2.

The Pivoting Conveying Subassembly 20

The pivoting Subassembly 20 includes the conveyor belt 25, drive pulley 30, high torque motor 35, drive timing chain 37, idler pulley 40, and the pivoting assembly frame 50.

The conveyor belt 25 is endless and has a roughened surface selected as needed as known in the art.

The drive pulley 30 and the idler pulley 40 are rotatably mounted relative to the pivoting assembly frame 50, and provide support for the endless conveyor belt 25, The high torque motor 35 is configured to drive the drive pulley 30 (and thus the conveyor belt 25) through the drive timing chain 37.

The pivoting assembly frame 50 is pivotally mounted relative to a corresponding conveyor frame member module.

Each conveying module frame member 90 of each module 11 of the conveyor apparatus 10 includes a conveyor frame carriage 95, which is configured to roll or otherwise move relative to an endless stationary, rail 97, such as shown in U.S. Pat. No. 5,433,311.

Operation

In operation, the module (a.k.a. "cell") carrying the parcel can travel horizontally at relatively high speeds, from 350 to 500 feet per minute in the direction of transport.

Just before it reaches its destination container, the pivoting conveying subassembly 20 begins to tilt and shortly thereafter the belt begins to accelerate. The particular timing can be varied as known in the art. In one embodiment of use, the belt should preferably not reach its 1G acceleration until the tray is at least tilted at an angle of 30 degrees so as to inhibit the parcel from either slipping or tumbling.

As noted above, the belt 25 is designed with a rough top surface to give extra grip on the parcel during discharge. The tilt is sufficient to prevent tumbling. The total acceleration may now exceed 1G without loss of control of the parcel.

The other features of this machine with respect to induction, traction, and control are the same as that of a simple cross belt sorter or a simple tilt tray. Hence they are not described here.

Figure 7:
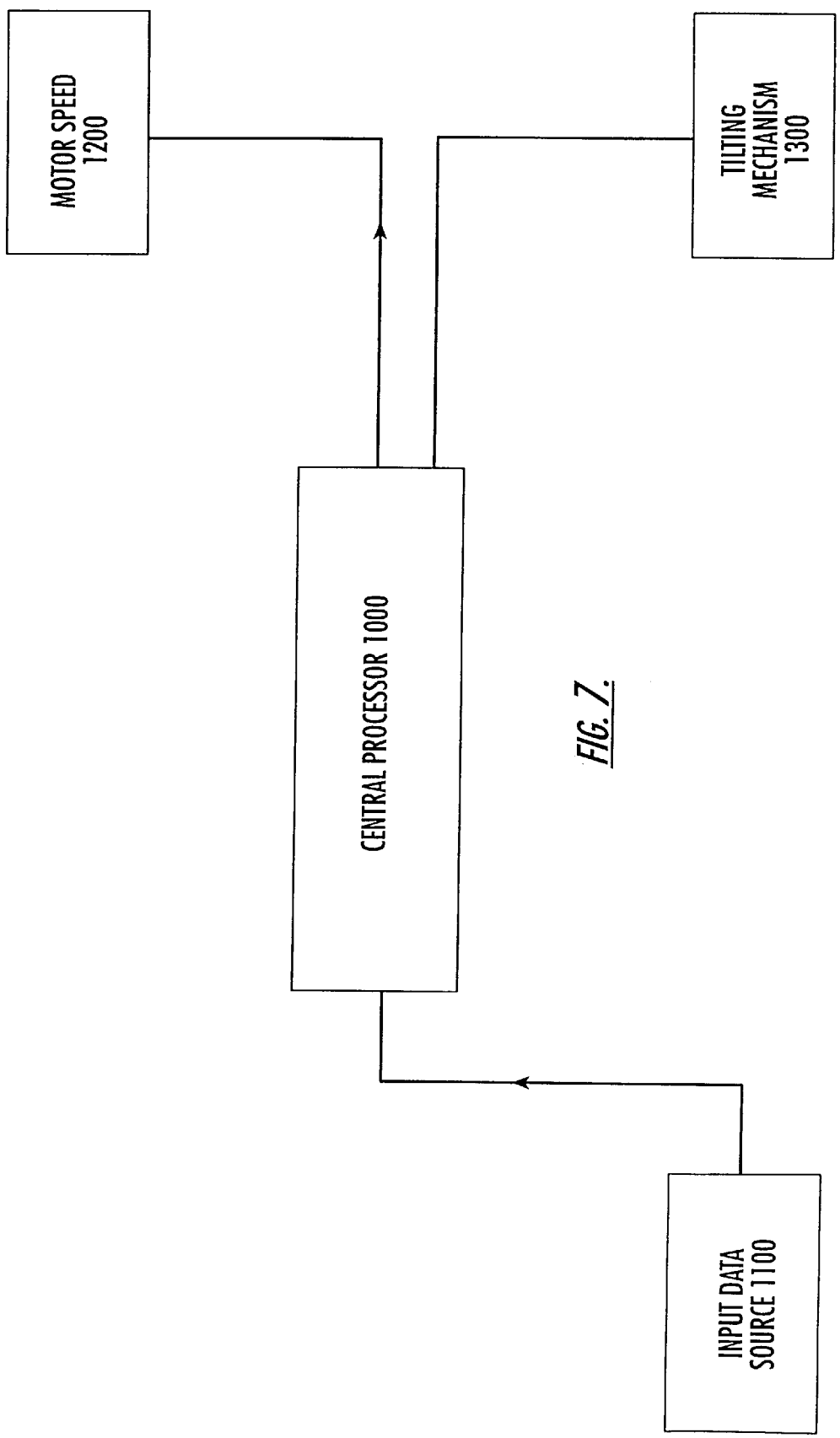
FIG. 7 shows a general control diagram, which illustrates a controller 1000 which accepts package information (e.g. package size, weight, and destination) illustrated via block 1100. Based on such information, the controller controls the drive belt (illustrated via block 1200) and also the operation of the titling mechanism, generally referenced via block 1300.

FIG. 7 shows a general control diagram, which illustrates a controller 1000 which accepts package information (e.g. package size, weight, and destination) illustrated via block 1100. Based on such information, the controller controls the drive belt (illustrated via block 1200) and also the operation of the tilting mechanism, generally referenced via block 1300.

Alternate Configurations

As may be understood, optional or alternate configurations may be provided.

Lugs

FIG. 6 shows an optional pair of lugs 25A, 25B which are attached atop the powered conveyor belt to provide additional pushing capabilities. As may be understood, the lugs 25A, 25B provide positive engaging members which engage the sides of the parcels, thus not relying on friction.

Four Way Tilting Cross Belt Sorter

Generally speaking most crossbelt sorters are designed to sort in two opposing directions or in some instances two extra outlet paths may be added by using a vertical gate type splitter on each side.

FIG. 4 shows optional additions to the conveying apparatus to provide an optional conveying apparatus 10, including upper withdrawal conveyors 300, 400, providing an "upper level" of discharge beyond the lower level of discharge provided into chutes 100, 200, thus providing includes upper and lower levels of destination.

The method used with the alternate configuration of FIG. 4 makes it feasible to sort small as well as large parcels with equal effectiveness simultaneously, thus making it possible for an operator to use a single machine instead of two.

Since large and heavy packages do not do well when subject to gravity it is much better to keep such packages under control at all times by sorting them by means of powered belted conveyors. Large packages when subject to gravity tend to accelerate too much or tend to roll or tumble due to their high center of gravity. In addition because of the above they tend to cause damage to themselves, to other packages as well as to the transportation equipment.

This is not the case with small and light packages. Small parcels maintain low acceleration and cause no damage when they roll or tumble, to themselves or the equipment handling them.

Under the system of FIG. 4 when a large, tall and heavy package is placed onto the system, appropriate controls will be use which will cause the larger packages to only be discharged on the "upper" part of the system. In such an instance the cross belt carrier remains horizontal. The package may be discharged left or right as the case may be departing on its destination. This in itself may be considered as one "mode" of the optional apparatus 10'. Determination of size and weight is done by weighing/dimensioning machines such as already available on the market.

When the package meets the low size and weight criteria programmed into the dimensional weighing machine, the resulting small parcel will always be discharged onto the "lower" level of the optional apparatus 10', by means of the tilting cross belt sorter into a receiving chute. The tilting may be done either left or right depending on the destination of the parcel. The entire "lower" level can be equipped with chutes and in effect can be treated like a second machine for small parcels only.

Under such a "dual level" configuration an apparatus for accommodating large and small packages is provided, thus requiring a much lower capital expenditure than if two separate machines are used.

Advantages

It may be understood that under the tilted condition of FIG. 2 it should be very unlikely that the package will tilt and roll uphill. In addition its discharge vector V will be directly oriented towards the receiving bin. There is less danger that the parcel will overshoot its destination bag as it often happens in a cross belt sorter trajectory inherent in those machines. Here the small parcel is actually "shot" into its bag rather than simply dragged into it.

As a result of such precise discharge, the whole system can now move at a much higher speed, allowing for a commensurate increase in productivity.

Conclusion

Therefore it may be seen that the present invention overcomes deficiencies in the prior art by providing the power of a cross belt sorter with the forces of gravity of a tilt tray and arriving a at sorting machine capable of very high sorting speed and therefore high productivity while exceeding the acceleration over 1G, all while keeping the parcel in control at all times without slipping or tumbling.

While this invention has been described in specific detail with reference to the disclosed embodiments, it will be understood that many variations and modifications may be effected within the spirit and scope of the invention as described in the appended claims.

What is claimed is:

1. A conveying apparatus for conveying articles, said apparatus comprising:

A) a stationary frame defining a path; and

B) at least one conveying module for movement relative to said stationary frame along said path, each module itself comprising:

1) a conveying module frame member configured for movement along said path, said conveying module frame member including a pivot mount location fixed relative to said conveying module frame member;

2) a pivoting conveying subassembly pivotably attached relative to said pivot mount location of said conveying module frame member, said pivoting conveying subassembly including a selectively powered conveyor for selectively discharging an article thereon; and 3) a tilting mechanism for tilting said pivoting conveying subassembly and said powered conveyor relative to said conveying module frame member, such that said pivoting conveying subassembly, including said powered conveyor, can be in a tilted position at the same time said powered conveyor is powered, thus causing said article atop said powered conveyor to be discharged both by gravity and conveyor force.

2. The conveying apparatus as claimed in claim 1, wherein said tilting mechanism is configured to be tilted before said powered conveyor selectively powers said powered conveyor.

3. The conveying apparatus as claimed in claim 1, wherein said tilting mechanism is configured to be tilted at approximately the same time said powered conveyor selectively powers said powered conveyor.

4. The conveying apparatus as claimed in claim 1, wherein said tilting mechanism is configured to be tilted after said powered conveyor selectively powers said powered conveyor but before said article is discharged from said conveyor.

5. The conveying apparatus as claimed in claim 1, wherein said stationary frame includes an endless stationary guide rail.

6. The conveying apparatus as claimed in claim 1, wherein said powered conveyor includes a powered conveyor belt defining an article supporting surface, and wherein said powered conveyor further includes at least one lug extending upwardly from said article supporting surface, for contacting and discharging said articles.

7. A conveying apparatus for conveying articles, said apparatus comprising:

A) a stationary frame defining a path; and
B) at least one conveying module for movement relative to said stationary frame along said path, each module itself comprising:
 1) a conveying: module frame member configured for movement along said path, said conveying module frame member including a pivot mount location fixed relative to said conveying module frame member;
 2) a pivoting conveying subassembly pivotably attached relative to said pivot mount location of said conveying module frame member, said pivoting conveying subassembly including a selectively powered conveyor belt for discharging an article thereon and a powered conveyor belt motor for selectively powering said powered conveyor belt, said powered conveyor belt having an upwardly-directed lug thereon; and
 3) a tilting mechanism for tilting said pivoting conveying subassembly and said powered conveyor belt relative to said conveying module frame member,
 such that said pivoting conveying subassembly, including said powered conveyor belt, can be in a tilted position at the same time said powered conveyor is selectively powered, thus causing said article atop said selectively powered conveyor to be discharged both by gravity and force exhibited by said lug.

8. A conveying apparatus for conveying articles, said apparatus comprising:

A) a stationary frame defining a path; and
B) at least one conveying module for movement relative to said stationary frame along said path, each module itself comprising:
 1) a conveying module frame member configured for movement along said path, said conveying module frame member including a pivot mount location fixed relative to said conveying module frame member;
 2) a pivoting conveying subassembly pivotably attached relative to said pivot mount location of said conveying module frame member, said pivoting conveying subassembly including a selectively powered conveyor belt for discharging an article thereon to either side of said path and a selectively powered conveyor belt motor for powering said powered conveyor belt in opposing directions depending on which side of said path to which said article is being discharged; and
 3) a tilting mechanism for tilting said pivoting conveying subassembly and said powered conveyor belt relative to said conveying module frame member, said tilting mechanism configured to tilt said pivoting conveying subassembly towards either side of said path, depending on which side of said path to which said article is being discharged, such that said pivoting conveying subassembly, including said powered conveyor belt, can be in a tilted position at the same time said powered conveyor belt is selectively powered, thus causing said article atop said powered conveyor belt to be discharged both by gravity and belt force.

9. The conveying apparatus as claimed in claim 8, wherein said pivoting conveying subassembly is configured to be tilted before said powered conveyor selectively powers said powered conveyor belt.

10. The conveying apparatus as claimed in claim 8, wherein said pivoting conveying subassembly is configured to be tilted at approximately the same time said powered conveyor selectively powers said powered conveyor belt.

11. The conveying apparatus as claimed in claim 8, wherein said pivoting conveying subassembly is configured to be tilted after said powered conveyor selectively powers said powered conveyor but before said article is discharged from said belt.

12. The conveying apparatus as claimed in claim 8, wherein said stationary frame includes an endless stationary guide rail.

13. The conveying apparatus as claimed in claim 8, wherein said powered conveyor belt defines an article supporting surface, and wherein said powered conveyor belt further includes at least one lug extending upwardly from said article supporting surface, for contacting and discharging said articles.

14. A conveying apparatus for conveying articles, said apparatus comprising:

A) a stationary frame defining a path; and
B) at least one conveying module for movement relative to said stationary frame along said path, each module .itself composing:
 1) a conveying module frame member configured for movement along said path, said conveying module frame member including a pivot mount location fixed relative to said conveying module frame member;
 2) a pivoting conveying subassembly pivotably attached relative to said pivot mount location of said conveying module frame member, said pivoting conveying subassembly including a selectively powered conveyor belt for discharging an article thereon to either side of said path and a selectively powered conveyor belt motor for selectively powering said powered conveyor belt in opposing directions depending on which side of said path to which said article is being discharged, said powered conveyor belt having an upwardly-directed lug thereon; and 3) a tilting mechanism for tilting said pivoting conveying subassembly and said powered conveyor belt relative to said conveying module frame member, such that said pivoting conveying subassembly, including said powered conveyor belt, can be in a tilted position at the same time said powered conveyor belt is selectively powered, this causing said article atop said powered conveyor belt to be discharged both by gravity and force exhibited by said lug.

15. A method of conveying articles, said method comprising the steps of:

A) providing a stationary frame defining a path;

B) providing at least one conveying module for movement relative to said stationary frame along said path, each module itself comprising:

1) a conveying module frame member configured for movement along said path, said conveying module frame member including a pivot mount location fixed relative to said conveying module frame member;

2) a pivoting conveying subassembly pivotably attached relative to said pivot mount location of said conveying module frame member, said pivoting conveying subassembly including a selectively powered conveyor for selectively discharging an article thereon; and 3) a tilting mechanism for tilting said pivoting conveying subassembly and said powered conveyor relative to said conveying module frame member; and C) discharging said article from said powered conveyor by tilting said pivoting conveying subassembly while said powered conveyor is powered, thus causing said article atop said powered conveyor to be discharged both by gravity and conveyor force.

16. The conveying method as claimed in claim 15, wherein in step B said powered conveyor is provided as a powered conveyor belt.

17. The conveying method as claimed in claim 15, wherein in step C, said pivoting conveying subassembly is tilted before said powered conveyor selectively powers said powered conveyor belt.

18. The conveying method as claimed in claim 15, wherein said pivoting conveying subassembly is configured to be tilted at approximately the same time said powered conveyor selectively powers said powered conveyor belt.

19. The conveying method as claimed in claim 15, wherein said pivoting conveying subassembly is configured to be tilted after said powered conveyor selectively powers said powered conveyor but before said article is discharged from said belt.

20. The conveying method as claimed in claim 15, further comprising the step of distinguishing between heavier and lighter articles in electing whether to tilt said pivoting conveying subassembly during discharge.

21. The conveying method as claimed in claim 15, further comprising the step of distinguishing between larger and smaller articles in electing whether to tilt said pivoting conveying subassembly during discharge.

22. A conveying apparatus for conveying articles, said apparatus comprising:

A) a stationary frame defining a path;

B) at least one conveying module for movement relative to said stationary frame along said path, each module itself comprising:

1) a conveying module frame member configured for movement along said path;

2) a pivoting conveying subassembly pivotably attached relative to said conveying module frame member, said pivoting conveying subassembly including a selectively powered conveyor belt for discharging an article thereon and a selectively powered conveyor belt motor for powering said powered conveyor belt; and 3) a tilting mechanism for tilting said pivoting conveying subassembly and said powered conveyor belt relative to said conveying module frame member, and C) a control device for distinguishing between heavier and lighter articles in electing whether to tilt said pivoting conveying subassembly during discharge, such that said pivoting conveying subassembly, including said powered conveyor belt, can be in a tilted position at the same time said powered conveyor belt is selectively powered, thus causing said article atop said powered conveyor belt to be discharged both by gravity and belt force, and such that distinction can be made between heavier and lighter articles in electing whether to tilt said pivoting conveying subassembly during discharge.

23. A conveying apparatus for conveying articles, said apparatus comprising:

A) a stationary frame defining a path;

B) at least one conveying module for movement relative to said stationary frame along said path, each module itself comprising:

1) a conveying module frame member configured for movement along said path;

2) a pivoting conveying subassembly pivotably attached relative to said conveying module frame member, said pivoting conveying subassembly including a selectively powered conveyor belt for discharging an article thereon and a selectively powered conveyor belt motor for powering said powered conveyor belt; and 3) a tilting mechanism for tilting said pivoting conveying subassembly and said powered conveyor belt relative to said conveying module frame member, and C) a control device for distinguishing between larger and smaller articles in electing whether to tilt said pivoting conveying subassembly during discharge, such that said pivoting conveying subassembly, including said powered conveyor belt, can be in a tilted position at the same time said powered conveyor belt is selectively powered, thus causing said article atop said powered conveyor belt to be discharged both by gravity and belt force, and such that distinction can be made between larger and smaller articles in electing whether to tilt said pivoting conveying subassembly during discharge.

24. A method of conveying a plurality of articles, said method comprising the steps of:

A) providing a stationary frame defining a path;

B) providing at least one conveying module for movement relative to said stationary frame along said path, each module itself comprising:

1) a conveying module frame member configured for movement along said path;
2) a pivoting conveying subassembly pivotably attached relative to said conveying module frame member, said pivoting conveying subassembly including a selectively powered conveyor for selectively discharging an article thereon; and
3) a tilting mechanism for tilting said pivoting conveying subassembly and said powered conveyor relative to said conveying module frame member from a first, nontilted, position to a second, tilted, position;

C) distinguishing between heavier and lighter articles;
D) upon determining if an article is a lighter article under step "C", discharging said articles from said powered conveyor by tilting said pivoting conveying subassembly to said second, tilted, position, while said powered conveyor is powered, thus causing said article atop said powered conveyor to be discharged both by gravity and conveyor force; and
E) upon determining if an article is a heavier article under step "C", discharging said article from said powered conveyor while said pivoting conveying subassembly is in said first, nontilted, position while said powered conveyor is powered, thus causing said article atop said powered conveyor to be discharged by conveyor force, such that a distinction between heavier and lighter articles is made in electing whether to tilt said pivoting conveying subassembly during discharge.

25. A method of conveying a plurality of articles, said method comprising the steps of:
A) providing a stationary frame defining a path;
B) providing at least one conveying module for movement relative to said stationary frame along said path, each module itself comprising:
1) a conveying module frame member configured for movement along said path;
2) a pivoting conveying subassembly pivotably attached relative to said conveying module frame member, said pivoting conveying subassembly including a selectively powered conveyor for selectively discharging an article thereon; and
3) a tilting mechanism for tilting said pivoting conveying subassembly and said powered conveyor relative to said conveying module frame member from a first, nontilted, position to a second, tilted, position;

C) distinguishing between larger and smaller articles;
D) upon determining if an article is a smaller article under step "C", discharging said articles from said powered conveyor by tilting said pivoting conveying subassembly to said second, tilted, position, while said powered conveyor is powered, thus causing said article atop said powered conveyor to be discharged both by gravity and conveyor force; and
E) upon determining if an article is a larger article under step "C", discharging said article from said powered conveyor while said pivoting conveying subassembly is in said first, nontilted, position while said powered conveyor is powered, thus causing said article atop said powered conveyor to be discharged by conveyor force, such that a distinction between heavier and lighter articles is made in electing whether to tilt said pivoting conveying subassembly during discharge.

26. A method of conveying a plurality of articles, said method comprising the steps of:
A) providing a stationary frame defining a path;
B) providing at least one conveying module for movement relative to said stationary frame along said path, each module itself comprising:
1) a conveying module frame member configured for movement along said path;
2) a pivoting conveying subassembly pivotably attached relative to said conveying module frame member, said pivoting conveying subassembly including a selectively powered conveyor belt for selectively discharging an article thereon; and
3) a tilting mechanism for tilting said pivoting conveying subassembly and said powered conveyor belt relative to said conveying module frame member from a first, nontilted, position to a second, tilted, position;

C) distinguishing between heavier and lighter articles;
D) upon determining if an article is a lighter article under step "C", discharging said articles from said powered conveyor belt by tilting said pivoting conveying subassembly to said second, tilted, position, while said powered conveyor belt is powered, thus causing said article atop said powered conveyor belt to be discharged both by gravity and conveyor force; and
E) upon determining if an article is a heavier article under step "C", discharging said article from said powered conveyor belt while said pivoting conveying subassembly is in said first, nontilted, position while said powered conveyor belt is powered, thus causing said article atop said powered conveyor belt to be discharged by conveyor force, such that a distinction between heavier and lighter articles is made in electing whether to tilt said pivoting conveying subassembly during discharge.

27. A method of conveying a plurality of articles, said method comprising the steps of:
A) providing a stationary frame defining a path;
B) providing at least one conveying module for movement relative to said stationary frame along said path, each module itself comprising:
1) a conveying module frame member configured for movement along said path;
2) a pivoting conveying subassembly pivotably attached relative to said conveying module frame member, said pivoting conveying subassembly including a selectively powered conveyor belt for selectively discharging an article thereon; and
3) a tilting mechanism for tilting said pivoting conveying subassembly and said powered conveyor belt relative to said conveying module frame member from a first, nontilted, position to a second, tilted, position;

C) distinguishing between larger and smaller articles;
D) upon determining if an article is a smaller article under step "C", discharging said articles from said powered conveyor belt by tilting said pivoting conveying subassembly to said second, tilted, position, while said powered conveyor belt is powered, thus causing said article atop said powered conveyor belt to be discharged both by gravity and conveyor force; and
E) upon determining if an article is a larger article under step "C", discharging said article from said powered conveyor belt while said pivoting conveying subassembly is in said first, nontilted, position while said powered conveyor belt is powered, thus causing said article atop said powered conveyor belt to be discharged by conveyor force, such that a distinction between larger and smaller articles is made in electing whether to tilt said pivoting conveying subassembly during discharge.

* * * * *

UNITED STATES PATENT AND TRADEMARK OFFICE
CERTIFICATE OF CORRECTION

PATENT NO.   : 6,554,123 B2
DATED        : April 29, 2003
INVENTOR(S)  : Bonnet

It is certified that error appears in the above-identified patent and that said Letters Patent is hereby corrected as shown below:

Column 7,
Line 42, after "conveying" cancel the colon (:).

Column 8,
Line 25, begin new sub-paragraph with "such that said";
Line 59, ".itself composing:" should read -- itself comprising: --.

Column 9,
Line 15, "this" should read -- thus --.

Signed and Sealed this

Second Day of September, 2003

JAMES E. ROGAN
*Director of the United States Patent and Trademark Office*